(12) United States Patent
Harjono et al.

(10) Patent No.: US 11,842,215 B2
(45) Date of Patent: *Dec. 12, 2023

(54) AUTOSCALING AND THROTTLING IN AN ELASTIC CLOUD SERVICE

(71) Applicant: Snowflake Inc., Bozeman, MT (US)

(72) Inventors: Johan Harjono, San Francisco, CA (US); Daniel Geoffrey Karp, San Carlos, CA (US); Kunal Prafulla Nabar, Burlingame, CA (US); Rares Radut, Kitchener (CA); Arthur Kelvin Shi, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,044

(22) Filed: Jan. 28, 2023

(65) Prior Publication Data
US 2023/0176909 A1 Jun. 8, 2023

Related U.S. Application Data

(63) Continuation of application No. 17/463,366, filed on Aug. 31, 2021, now Pat. No. 11,599,389.

(60) Provisional application No. 63/202,769, filed on Jun. 23, 2021.

(51) Int. Cl.
*G06F 9/50* (2006.01)
*G06F 9/355* (2018.01)

(52) U.S. Cl.
CPC ......... *G06F 9/5005* (2013.01); *G06F 9/3555* (2013.01); *G06F 9/505* (2013.01); *G06F 9/5077* (2013.01); *G06F 9/5083* (2013.01)

(58) Field of Classification Search
CPC .............................. G06F 9/5005; G06F 9/5083
See application file for complete search history.

(56) References Cited

U.S. PATENT DOCUMENTS

| 10,761,889 | B1 | 9/2020 | Jain et al. |
|---|---|---|---|
| 11,347,550 | B1 | 5/2022 | Harjono et al. |
| 11,461,150 | B1 | 10/2022 | Harjono et al. |
| 2006/0075101 | A1 | 4/2006 | Anerousis et al. |
| 2012/0131594 | A1 | 5/2012 | Morgan |
| 2015/0339728 | A1* | 11/2015 | Sura ................... G06Q 30/0277 705/14.73 |
| 2018/0109590 | A1 | 4/2018 | Rao et al. |

(Continued)

OTHER PUBLICATIONS

"U.S. Appl. No. 17/462,658, Final Office Action dated Mar. 3, 2022", 10 pgs.

(Continued)

*Primary Examiner* — Sisley N Kim
(74) *Attorney, Agent, or Firm* — Schwegman Lundberg & Woessner, P.A.

(57) ABSTRACT

Techniques described herein can optimize usage of computing resources in a data system. Dynamic throttling can be performed locally on a computing resource in the foreground and autoscaling can be performed in a centralized fashion in the background. Dynamic throttling can lower the load without overshooting while minimizing oscillation and reducing the throttle quickly. Autoscaling may involve scaling in or out the number of computing resources in a cluster as well as scaling up or down the type of computing resources to handle different types of situations.

24 Claims, 14 Drawing Sheets

(56) References Cited

U.S. PATENT DOCUMENTS

| | | |
|---|---|---|
| 2018/0203744 A1 | 7/2018 | Wiesmaier et al. |
| 2020/0409584 A1 | 12/2020 | Matsumoto et al. |
| 2021/0133075 A1 | 5/2021 | Agrawal et al. |
| 2021/0157645 A1* | 5/2021 | Yanacek ............... G06F 9/5077 |
| 2022/0413913 A1 | 12/2022 | Harjono et al. |

OTHER PUBLICATIONS

"U.S. Appl. No. 17/462,658, Non-Final Office Action dated Jan. 20, 2022", 21 pgs.

"U.S. Appl. No. 17/462,658, Notice of Allowance dated Jun. 6, 2022", 8 pgs.

"U.S. Appl. No. 17/462,658, Response filed Feb. 11, 2022 to Non-Final Office Action dated Jan. 20, 2022", 8 pgs.

"U.S. Appl. No. 17/462,658, Response filed May 23, 2022 to Final Office Action dated Mar. 3, 2022", 8 pgs.

"U.S. Appl. No. 17/463,366, Final Office Action dated Mar. 3, 2022", 16 pgs.

"U.S. Appl. No. 17/463,366, Non-Final Office Action dated Nov. 12, 2021", 15 pgs.

"U.S. Appl. No. 17/463,366, Notice of Allowance dated Nov. 7, 2022", 16 pgs.

"U.S. Appl. No. 17/463,366, Preliminary Amendment filed Sep. 10, 2021", 7 pgs.

"U.S. Appl. No. 17/463,366, Response filed Feb. 11, 2022 to Non-Final Office Action dated Nov. 12, 2021", 8 pgs.

"U.S. Appl. No. 17/463,366, Response filed May 23, 2022 to Final Office Action dated Mar. 3, 2022", 9 pgs.

"U.S. Appl. No. 17/463,376, Non-Final Office Action dated Nov. 12, 2021", 16 pgs.

"U.S. Appl. No. 17/463,376, Notice of Allowance dated Mar. 9, 2022", 8 pgs.

"U.S. Appl. No. 17/463,376, Preliminary Amendment filed Sep. 10, 2021", 9 pgs.

"U.S. Appl. No. 17/463,376, Response filed Feb. 11, 2022 to Non-Final Office Action dated Nov. 12, 2021", 11 pgs.

* cited by examiner

AUTOSCALING AND THROTTLING IN AN ELASTIC CLOUD SERVICE

CROSS-REFERENCE TO RELATED APPLICATION

This application is a Continuation of U.S. patent application Ser. No. 17/463,366, filed Aug. 31, 2021, which claims the benefit of priority to U.S. Provisional Patent Application Ser. No. 63/202,769 filed Jun. 23, 2021, the contents of which are incorporated herein by reference in their entireties.

TECHNICAL FIELD

The present disclosure generally relates to flexible computing, in particular autoscaling and throttling in an elastic cloud service of a database system.

BACKGROUND

As the world becomes more data driven, database systems and other data systems are storing more and more data. For a business to use this data, different operations or queries are typically run on this large amount of data. Some operations, for example those including large table scans or executing multiple queries, can take a substantial amount of time to execute on a large amount of data. The time to execute such operations can be proportional to the number of computing resources used for execution, so time can be shortened using more computing resources.

To this end, some data systems can provide a pool of computing resources, and those resources can be assigned to execute different operations. However, in such systems, the assigned computing resources typically work in conjunction, for example in a cluster group. Hence, their assignments are fixed and static. That is, a computing resource can remain assigned to an operation, which no longer needs that computing resource. The assignments of those computing resources cannot be easily modified in response to demand changes. Hence, the computing resources are not utilized to their full capacity.

Some systems can impose fixed per-instance, per-account, and per-user limits on the number of queries entering a single computing resource to limit unexpected or periodic workloads and protect the cluster. However, these limits can be unreliable: some workloads that have a low query cardinality can fall below static limits but can still cause load issues depending on their compilation patterns.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques described herein can optimize usage of computing resources in a data system. Dynamic throttling can be performed locally on a computing resource in the foreground and autoscaling can be performed in a centralized fashion in the background. Dynamic throttling, as described herein, can lower the load or usage without overshooting while minimizing oscillation and reducing the throttle quickly. Autoscaling may involve scaling in or out the number of computing resources in a cluster as well as scaling up or down the type of computing resources to handle different types of load situations.

Figure 1:
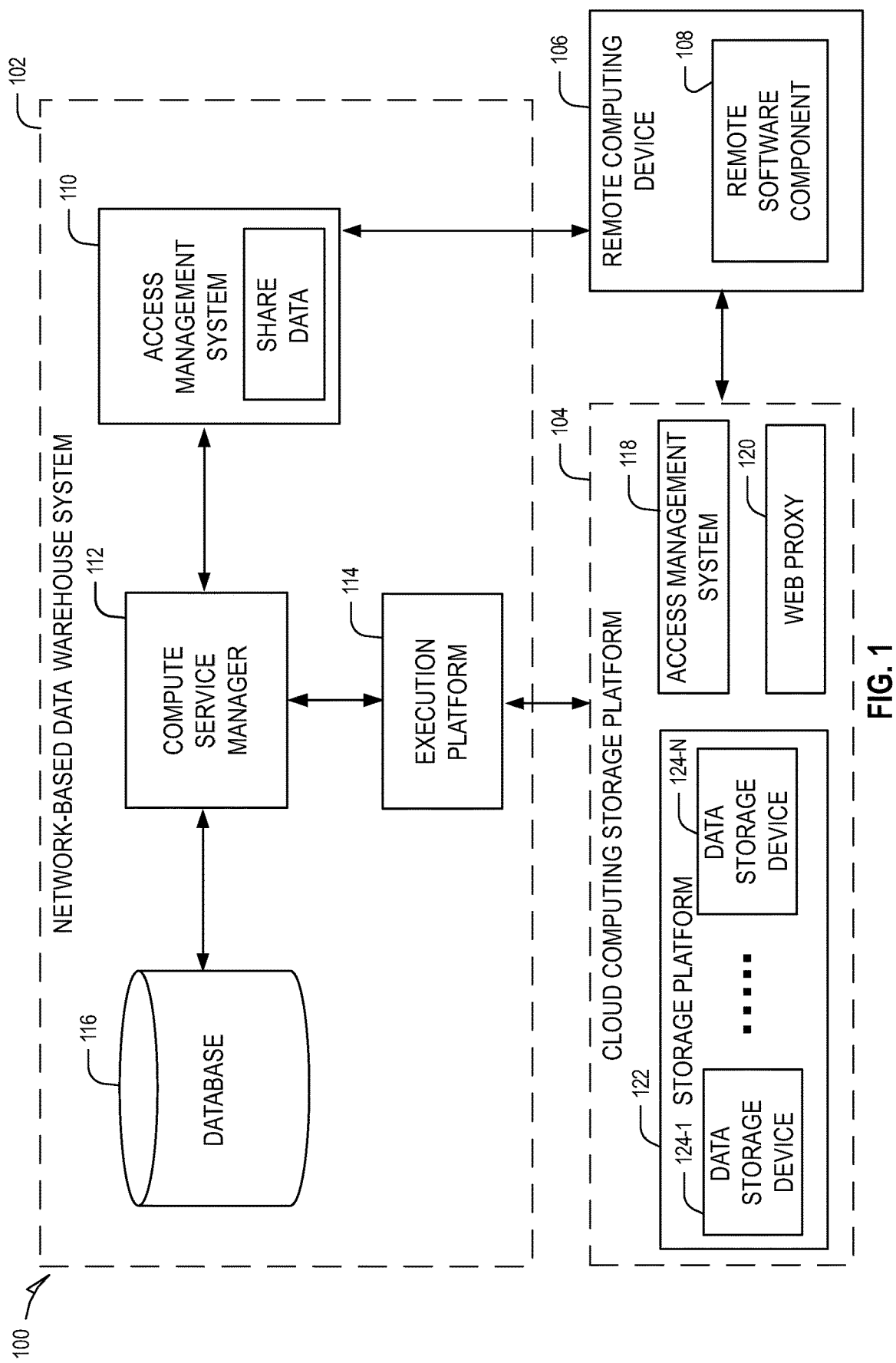
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
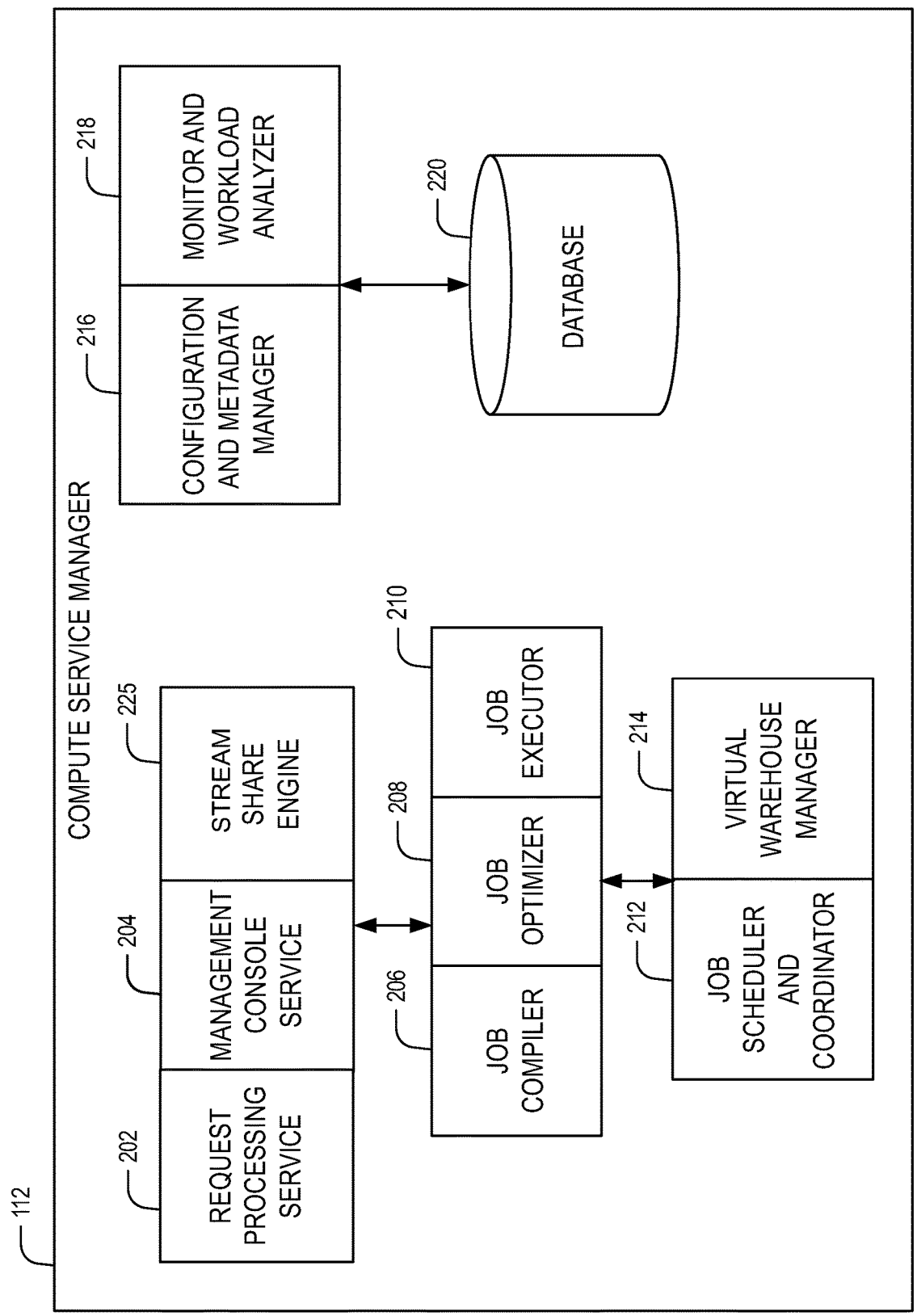
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
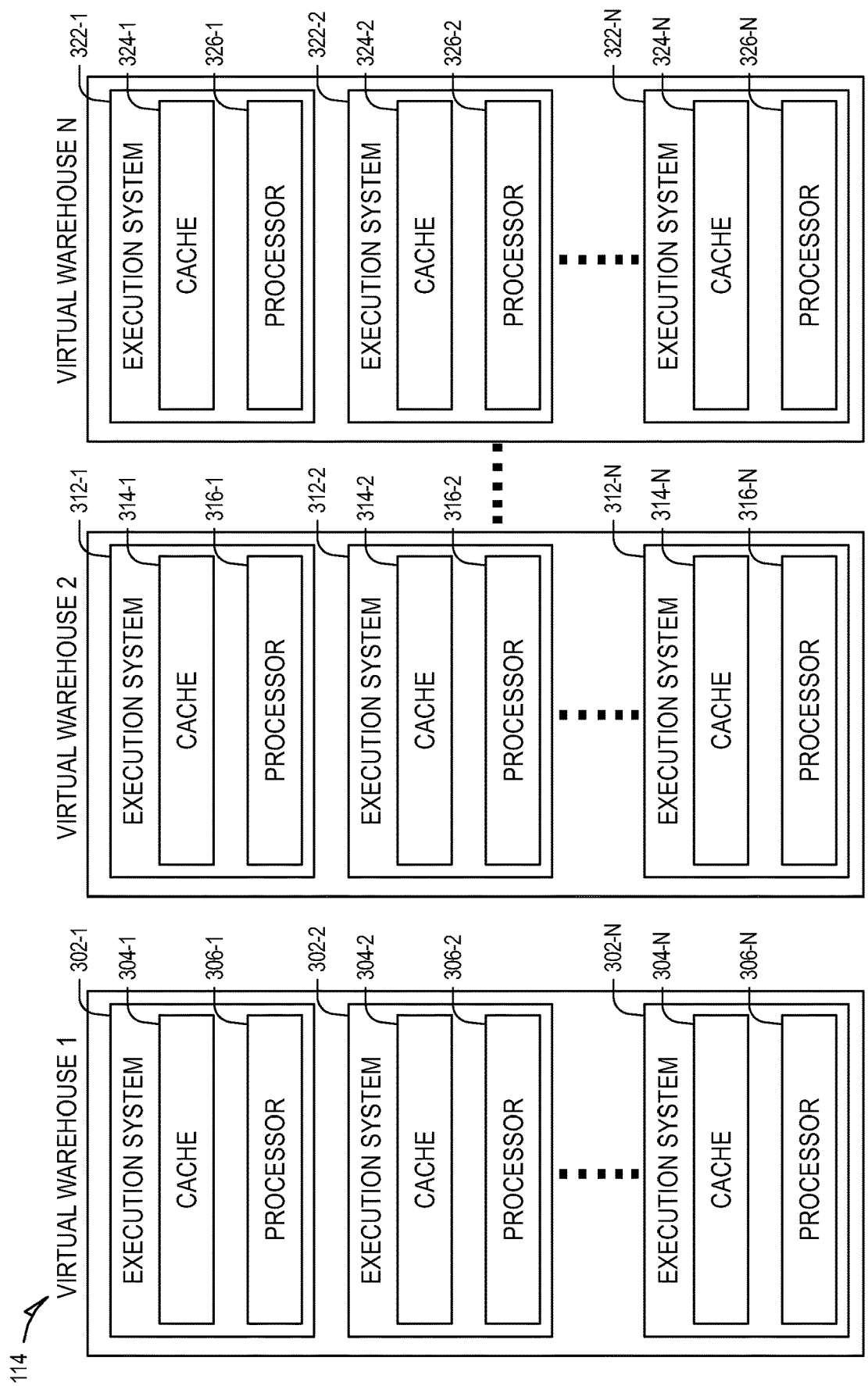
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
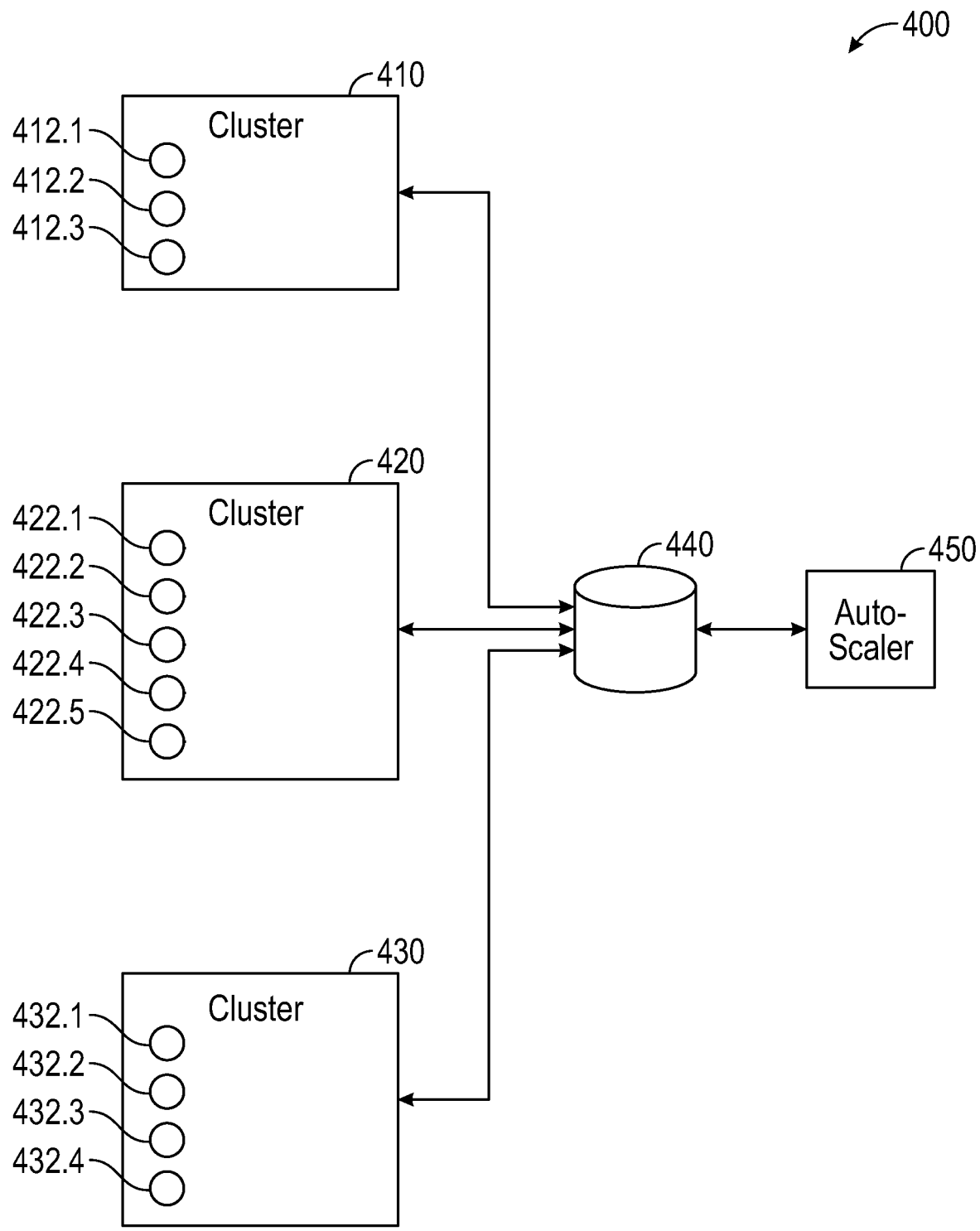
FIG. 4 shows an example of a data system configured for throttling and autoscaling, according to some example embodiments.

Next, dynamic throttling and autoscaling techniques will be described. FIG. 4 shows an example of a data system 400 configured for throttling and autoscaling, according to some example embodiments. The data system 400 may include a plurality of foreground clusters 410, 420, 430. Each foreground cluster may include a plurality of computing resources (also referred to as nodes, instances, servers). In this example, foreground cluster 410 may include computing resources 412.1-412.3; foreground service 420 may include computing resources 422.1-422.5; and foreground service 430 may include computing resources 432.1-432.4. The foreground clusters may have different number of computing resources, and the number of computing resources assigned to each cluster may change based on the autoscaling techniques, described in further detail below.

A foreground cluster may be assigned to a group of accounts in a multi-tenancy embodiment. A foreground cluster may be assigned to a single account in a dedicated-cluster embodiment. The foreground clusters may receive requests or queries and develop query plans to execute the queries. The foreground clusters may broker requests to its computing resources that execute a query plan. The foreground clusters may receive query requests from different sources, which may have different account IDs. For certain operations, such as those involving multiple computing resources working together to execute different portions of an operation (e.g., large table scans), the source may be defined at a data warehouse level granularity.

The computing resources may be computing nodes allocated to the foreground GS 400 from a pool of computing nodes. In an embodiment, the computing resources may be machines, servers, CPUs, and/or processors.

The clusters 410, 420, 430 may communicate with a centralized autoscaler 450 over a network. In an embodiment, communications between the clusters 410, 420, 430 and autoscaler 450 may be performed via a metadata database 440. That is, the components in the clusters 410, 420, 430 may transmit messages, for example relating to their current workloads, to the metadata database 440, where the information from those messages may be stored. The reverse proxy server can route requests across the components in the clusters 410, 420, 430 and the autoscaler 450 may read the information sent by the clusters 410, 420, 430 from the metadata database 440.

In another embodiment, communications between the clusters 410, 420, 430 and the autoscaler 450 may be performed directly via, for example, remote procedure calls such as gRPCs. Moreover, communications between the clusters 410, 420, 430 and the autoscaler 450 may be performed using a combination of direct communication (e.g., remote procedure calls) and indirect communications (e.g., via metadata database).

The autoscaler 450 may be coupled to a cloud resource provider. The cloud resource provider may maintain a pool of computing resources. The computing resources may be of different types and have different specifications, as described in further detail below. In an embodiment, the autoscaler 450 may communicate with a communication layer over the cloud resource provider.

Dynamic throttling in foreground instances may be coupled with centralized autoscaling, which runs in a background instance. Dynamic throttling may be implemented by each computing resource of a data system (e.g., computing resources 412.1-412.3, 422.1-422.5, 432.1-432.4 of data system 400). Throttling may be localized at each node and may not need communications with other nodes to be implemented.

Figures 5, 6:
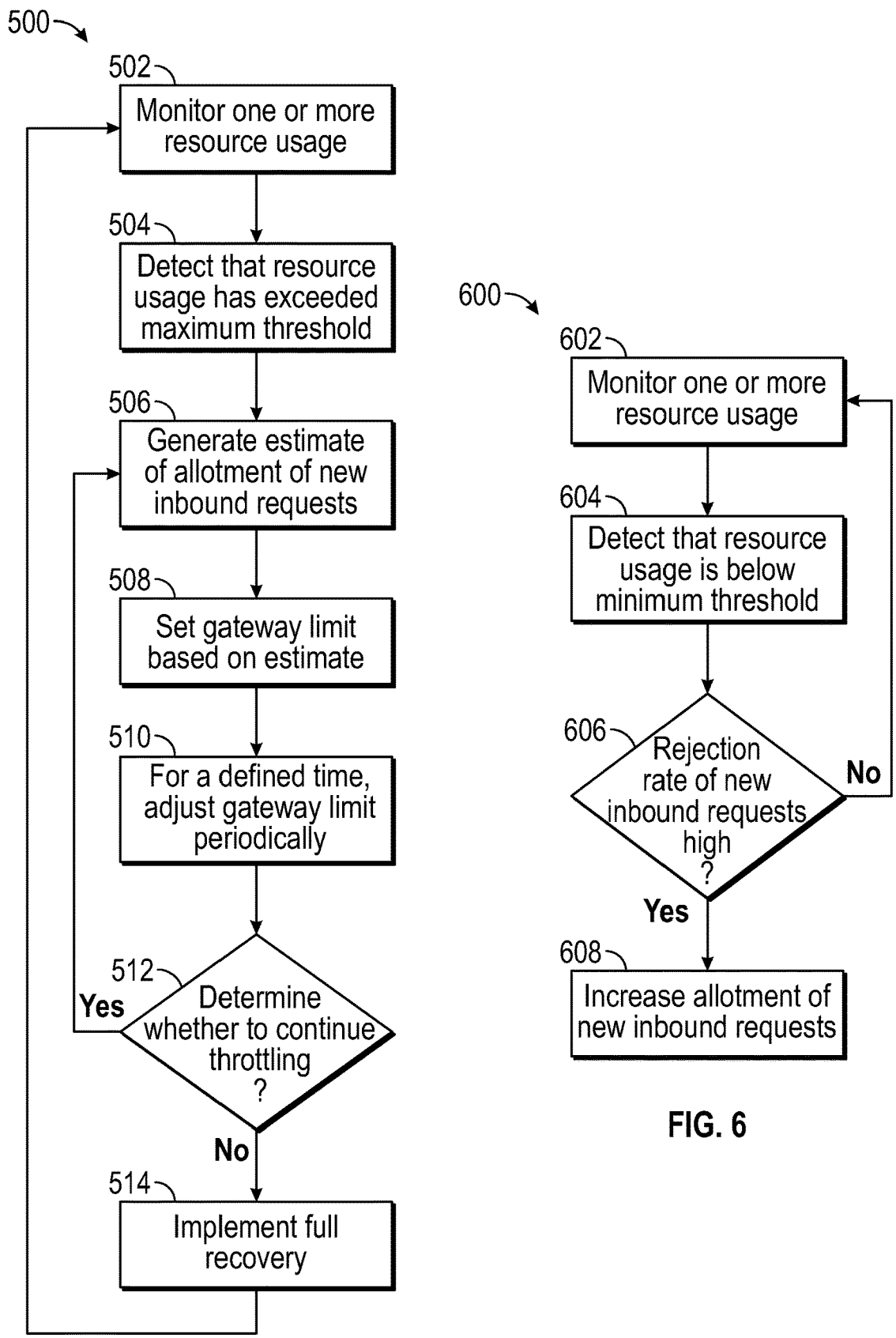
FIG. 5 illustrates a flow diagram for a method for throttling, according to some example embodiments.
FIG. 6 illustrates a flow diagram for a method for expansion, according to some example embodiments.

FIG. 5 illustrates a flow diagram for a method 500 for throttling, according to some example embodiments. Method 500 may be executed by a computing resource, as described herein.

At operation 502, a computing resource may monitor one or more resource usage. The resource usage(s) may include load usage, memory usage, saturation level, and other computing-type resources or a combination thereof. Load usage (also called CPU usage) may correspond to a number of runnable tasks divided by existing cores/processors. In other words, it is the number of tasks to be executed divided by the number of things that can execute those tasks. Memory may correspond to local memory at the computing resource.

At operation 504, the computing resource may detect that the one or more monitored resource usage has exceeded a maximum threshold. The maximum threshold may be predefined by a network administrator and may be based on the specification of the computing resource.

At operation 506, the computing resource may generate an estimate of new inbound requests (e.g., queries) that should be allowed to be processed by the computing resource to lower the resource usage to below the maximum threshold (also referred to as allotment of new inbound requests). The computing resource may execute and not disturb pending requests so that the throttling only impacts inbound requests. The estimate may take into consideration the current amount of requests pending. For example, consider a scenario where the maximum threshold of load usage is set to 1; the current load usage is 2.0; and there are 10 current jobs/requests pending. In this example scenario, the estimate may be reducing the new inbound requests to 5 jobs/requests may reduce the load to below the maximum threshold.

At operation 508, a gateway limit of new inbound requests may be set for the computing resource. The gateway limit may be based on the estimate to lower the resource usage to below the maximum threshold. Inbound requests over the gateway limit may be rejected by the computing resource. The rejection may include an instruction to the client to retry the request that was rejected after some time. Thus, the request would be resent by the client after some time and may then be processed. For example, the request when it is resent may be assigned to a different computing resource. In some embodiments, the computing resources may be assigned new requests in a round robin fashion (or via use of another scheduling algorithm) by a reverse proxy server. In another example, that request may be sent to the same computing resource, which may now have the bandwidth to handle the request.

At operation 510, for a defined time interval (e.g., three minutes), the computing resource may periodically (e.g., every thirty seconds) adjust the gateway limit based on current resource usage. That is, the computing resource may monitor the current resource usage and may adjust the gateway limit up or down accordingly. The adjustment may be incremental in that the adjustment may be a set amount for each periodical adjustment (e.g., 10%). This may reduce oscillation.

At operation 512, at the end of the defined time interval, the computing resource may determine whether to continue throttling or not. This determination may be based on current resource usage as monitored by the computing resource and the current rejection rate of new inbound requests.

If it is determined that the throttling should continue, the method may jump to operation 506 and a new estimate of new inbound requests (e.g., queries) that should be allowed to be processed by the computing resource to lower the resource usage. Hence, the method may then perform incremental adjustments (operations 508-510) for another defined time interval (e.g., 3 minutes).

If it is determined that throttling is no longer needed, a full recovery may be implemented at operation 514. Full recovery may include eliminating the gateway limits on new inbound requests and setting the limit to its default value. Moreover, the computing resource may then revert to operation 502 and monitor the one or more resource usage.

The gateway limits set in throttling may be customized or scaled on an account and/or user level. In a multi-tenancy embodiment, the computing resource may implement the gateway limit using a fairness algorithm on an account basis. For example, the gateway limit may include a provision that no account can use more than a set percentage (e.g., 50%) of the allotment of new inbound requests. The gateway limit may be applied evenly causing all accounts to reduce the new requests evenly. Therefore, the account with the highest job account may be the first to be limited.

In an example, two types of throttling coefficients may be used. The first is the instance coefficient that adjusts the amount of requests that each individual instance can receive. The second coefficient is an account level coefficient that adjusts the total number of concurrent requests an account can run in its cluster. These coefficients may be dynamically updated at routine intervals (e.g., every 30 seconds).

Moreover, the gateway limit may also be set on a user level in a single tenant environment and a multitenant environment. For example, the gateway limit may include a provision that no user of an account can use more than a set percentage (e.g., 25%) of that account's allotment of new inbound requests.

Moreover, computing resources may be configured to perform expansion instead of throttling based on monitored conditions. FIG. 6 illustrates a flow diagram for a method 600 for expansion, according to some example embodiments. Method 600 may be executed by a computing resource, as described herein.

At operation 602, a computing resource may monitor one or more resource usage(s). The resource usage(s) may include load usage, memory usage, saturation level, and other computing-type resources.

At operation 604, the computing resource may detect that the one or more monitored resource usage is below a minimum threshold. The minimum threshold may be predefined by a network administrator and may be based on the specification of the computing resource.

At operation 606, the computing resource may monitor a rejection rate of new inbound requests and may compare the rejection rate to a set rate.

At 608, if the rejection rate is higher than the set rate, the computing resource may increase the number of inbound requests it will accept. Hence, if the resource usage is below a minimum threshold and the rejection rate of inbound requests is still above a set rate, the computing resource may increase the amount of acceptable inbound requests to further optimize its performance and usage.

Figure 7:
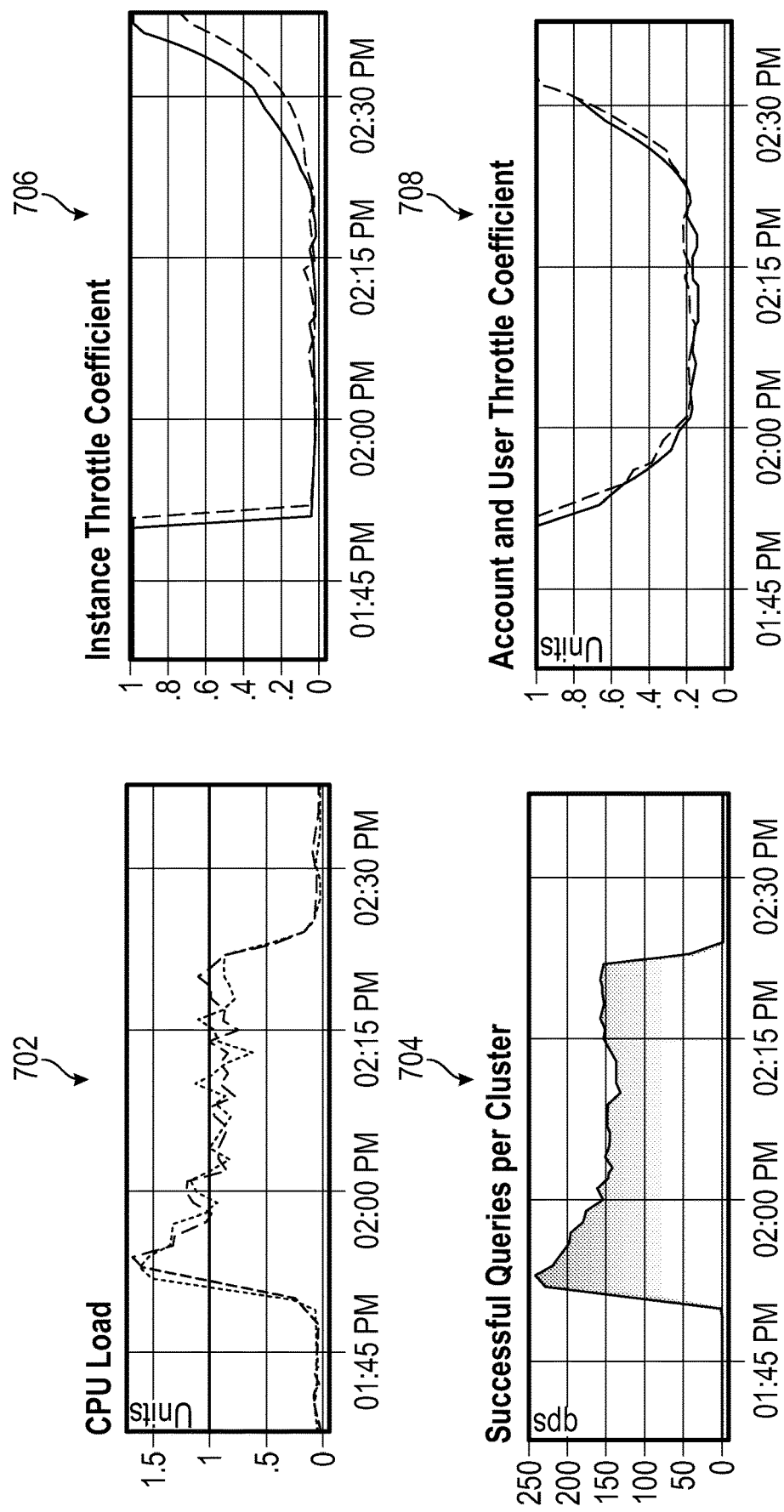
FIG. 7 illustrates synthetic workload running transaction processing council-decision support (TPC-DS), according to some example embodiments.

FIG. 7 illustrates a synthetic workload running transaction processing council-decision support (TPC-DS) which analyzes the performance of online analytical processing (OLAP) databases. In this test environment, dynamic throttling is active with a cluster configured to have two compute service instances. The generated workload exceeded the CPU capacity of two compute service instances. Dynamic throttling reacted to the excessive load and reduced the gateway limits to maintain the healthy state of the available instances. In the top left (702), the CPU load of the two instances is reported. It is observed that the load exceeded the available CPU capacity. This is highly correlated with the query count in the bottom left graph (704). The top right graph (706) shows the throttle coefficient of the throttled being lowered to enforce a new gateway size, effectively applying a small multiplier to our gateways. Finally, after the throttler determines the new gateway limit, fewer queries are let through. In the bottom left graph (708), the query throughput drops to a sustainable amount, which also causes a drop in the associated load the instances face.

Furthermore, after the initial estimation the coefficient in the top right graph (706) can be seen to adjust incrementally. It initially drops lower to temper the workload further, and maintains a balance keeping the CPU load at approximately 1.0, which is the target.

The bottom right graph (708) displays the coefficient used for account & user specific limits. To maintain fairness, the limit is applied evenly, causing all accounts to reduce evenly. Therefore, the account with the highest job count will be the first to be limited. It should be noted the limitation of dynamic throttling is transient and upon rejecting these queries a signal is provided to the autoscaling framework to add instances to overloaded clusters, as described in further detail below. This can temper transient load spikes and prevent them from causing downstream issues in the database system until their workload can be accommodated.

Autoscaling may be performed in a centralized fashion. Autoscaling may include scaling in and out computing resources. Scaling in refers to removing computing resources from a cluster, and scaling out refers to adding computing resources to a cluster. Autoscaling may also include scaling up and down computing resources. Scaling up refers to changing the computing resources of a cluster with computing resources with a higher level, and scaling down refers to changing the computing resources of a cluster with computing resources with a lower level. These higher or lower levels may refer to specification aspects of the computing resources such as memory capacity, for example.

Figure 8:
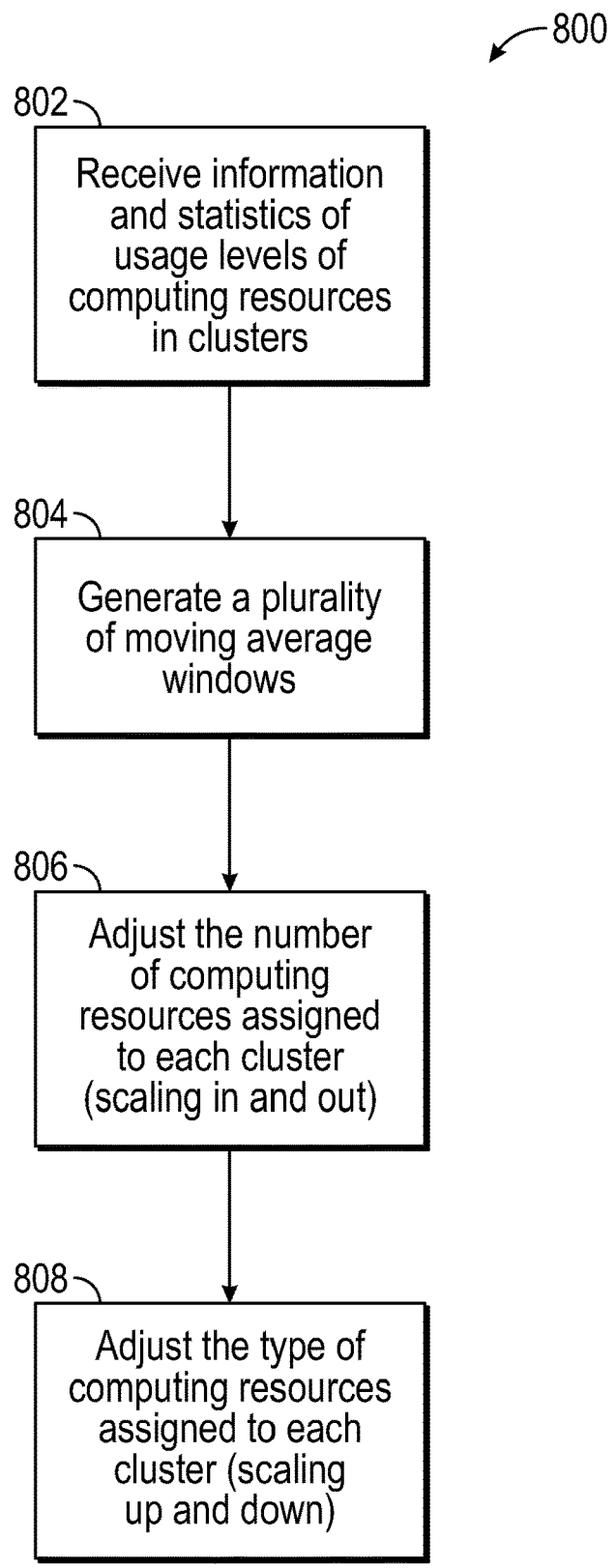
FIG. 8 a flow diagram for a method for autoscaling, according to some example embodiments.

FIG. 8 illustrates a flow diagram for a method 800 for autoscaling, according to some example embodiments. Method 800 may be executed by an autoscaler, as described herein.

At operation 802, an autoscaler may receive information and statistics related to usage levels of the computing resources in different clusters. This information may include usage level on a per-node basis and may include results of dynamic throttling being performed by each node. This information received may include load average, rate of rejections (e.g., total number of rejections/number of requests), etc.

This information may also include notification of garbage collection (GC) moments, such as a full GC moment, and out-of-memory errors. The information may also include an indication of any requests that may have been terminated. For example, if a query is received and the parse tree for that query is relatively large and is memory intensive, that query may be terminated before execution to prevent other errors such as an out-of-memory error.

At operation 804, based on the information received, a plurality of different moving average windows may be generated. In one embodiment, three moving average windows may be generated. A short window (e.g., 1 minute) may be based on information relating to the system and node conditions for the last minute. A medium window (e.g., 5 minutes) may be based on information relating to the system and node conditions for the last five minutes. A long window (e.g., 15 minutes) may be based on information relating to the system and node conditions for the last 15 minutes.

At operation 806, based on the information received and the different moving average windows, the autoscaler may adjust the number of computing resources assigned to each cluster. The autoscaler may scale in or out (or keep the same) the number of computing resources for the cluster. Scaling in refers to adding computing resources to a cluster, and scaling out refers to removing computing resources from a cluster.

Scaling in or out may be performed according to the following formula:

$$desiredNodes = \lceil currentNodes * currentMetricValue / desiredMetricValue \rceil$$

desiredNodes refers to the optimized number of nodes for the cluster. currentNodes refers to the current number of nodes assigned to that cluster. currentMetricValue refers to the current monitored resource usage value (e.g., load value, memory usage), and desiredMetricValue refers to the threshold usage value. For example: if currentNodes=30 and desiredMetricValue for load is 1.0. If currentMetricValue drops to 0.98, then the system may scale in by 1 instance.

Scaling in or out may be done incrementally. For example, the autoscaler may scale out by a maximum of two nodes in a given iteration. The autoscaler may scale in by a maximum of one node in a given iteration. These limits may help avoid oscillation.

Different moving average windows may be considered for scaling in and out. For example, to scale out, only the short window (e.g., 1 minute) may be analyzed to determine whether it is high. To scale in, a plurality of windows, such as all windows (e.g., 1, 5, and 15 minutes), may be analyzed to determine whether all three windows are low.

At operation 808, based on the information received and the different moving average windows, the autoscaler may adjust the type of computing resources assigned to each cluster. One node type may be assigned per cluster. That is, all computing resources of a cluster may be the same type. The autoscaler may scale up or down (or keep the same) the type of computing resources for the cluster. Scaling up refers to changing the computing resources of a cluster with computing resources with a higher level and scaling down refers to changing the computing resources of a cluster with computing resolves with a lower level. These higher or lower levels may refer to specification aspects of the computing resources such as memory capacity, for example.

Scaling up or down may address situations where adding or removing computing resources may not adequately address. These situations may include memory issues. Simply adding or removing computing resources may not adequately address memory issues facing those computing resources. For example, if a computing resource is determined to have not enough memory to perform certain tasks, the autoscaler may scale up the computing resources for that cluster to computing resources with larger memories. In another example, the autoscaler may scale down the computing resources of a cluster if it is determined that the tasks assigned to that cluster can be performed with computing resources with smaller memories or other specification aspects. Scaling down may reduce costs.

High and low thresholds may be set to determine the best suited computing resource for each cluster. This may be done predictively based on the high and low thresholds so a critical failure is not reached. Moreover, historical trends, such as recent history, may be taken into consideration in the selection.

The autoscaling techniques described herein can be effective in optimizing usage of computing resources in a data system. They can be effective against recurring bursty workloads followed by long periods of idleness or random bursts (e.g., bursts are distributed randomly/non-uniformly over a time window). They can efficiently handle different types of queries. For example, some queries can be short-lived, some are long-running and these ones can occupy a compute service node for hours. The autoscaling techniques described herein can account for these different types of queries.

Example 1—An Internal Analysis Cluster

Figure 9:
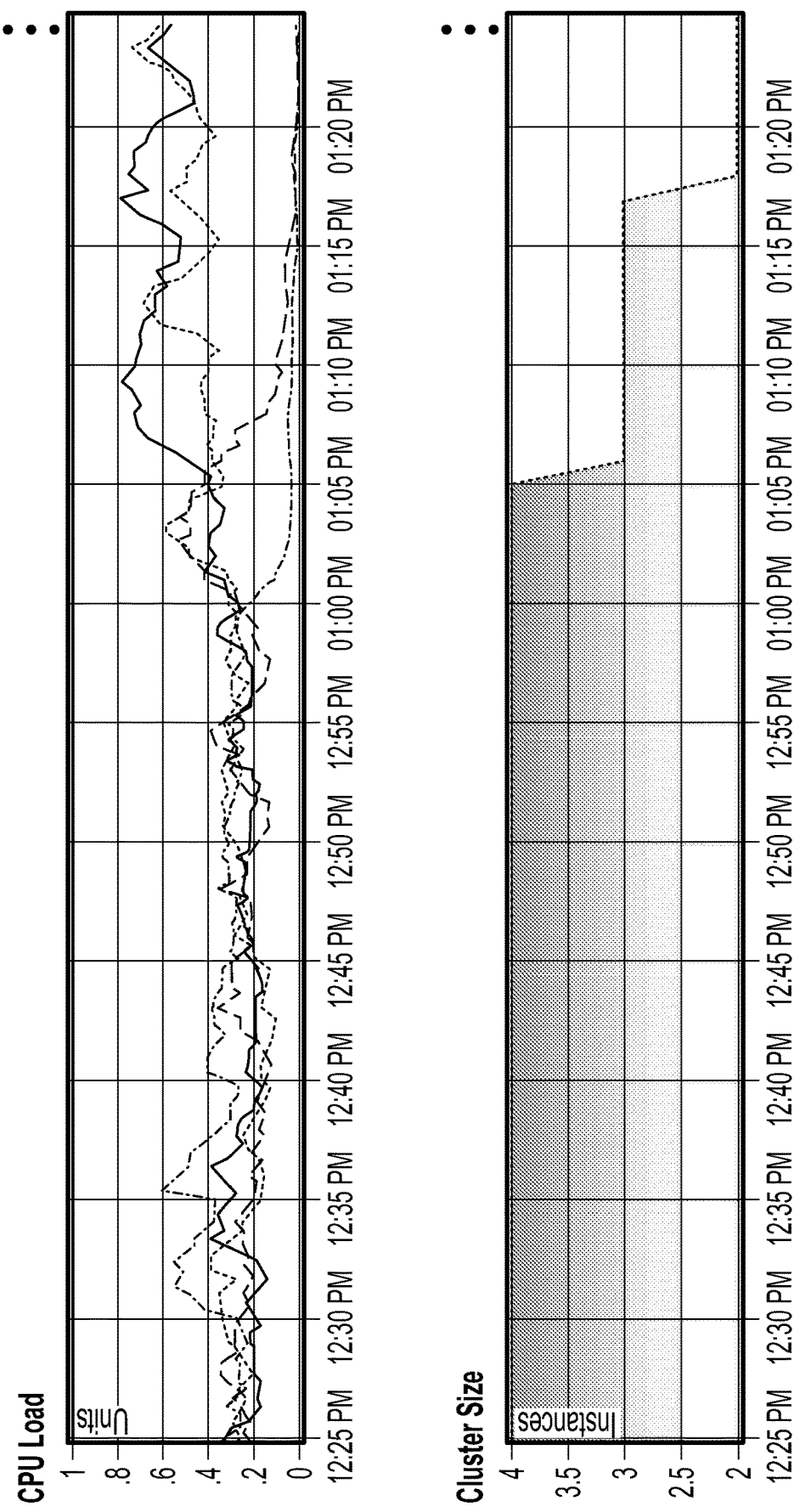
FIG. 9 shows CPU load and cluster size monitoring in an internal analysis cluster example, according to some example embodiments.

Autoscaling and dynamic throttling, as described herein, are synergistic and therefore can be combined. When enabling the features on an internal data analysis account scaling was performed in the cluster. FIG. 9 shows CPU load and cluster size monitoring in an internal analysis cluster example. FIG. 9 shows the cluster instance count in the bottom chart. The cluster was reduced to two instances as the scaling framework recognizes the compute resources of all four instances were not required.

Figure 10:
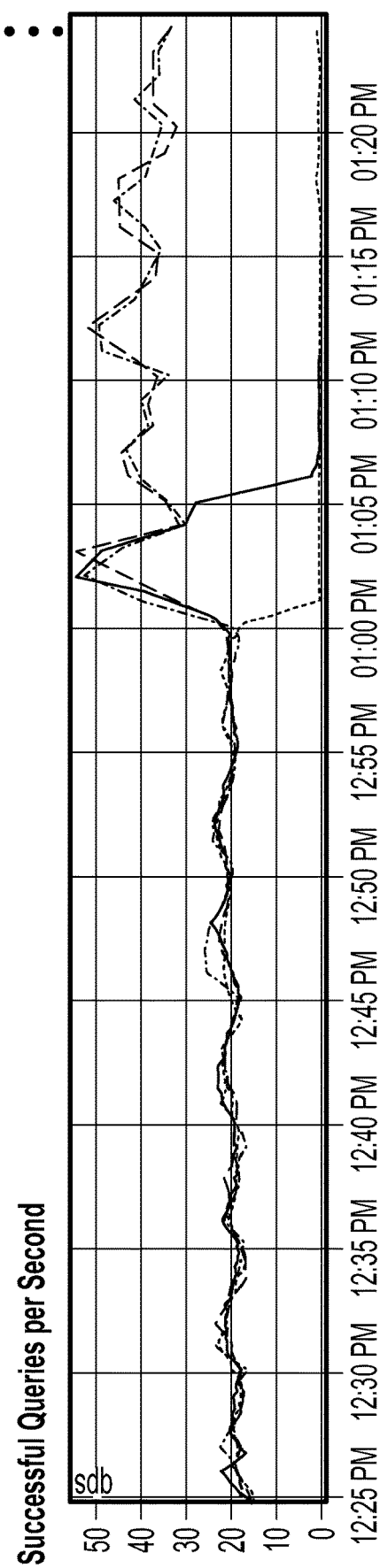
FIG. 10 shows successful queries and average concurrent request monitoring in an internal analysis cluster example, according to some example embodiments.
Figure 10:
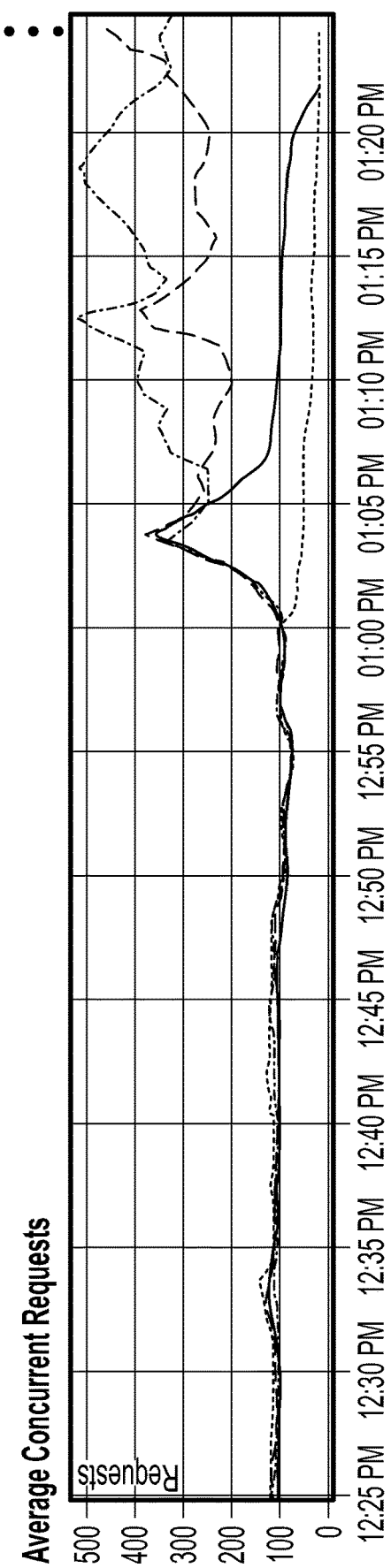

FIG. 10 shows successful queries and average concurrent request monitoring in an internal analysis cluster example. In FIG. 10, it can be seen that two of the lines, each representing an instance, drop to serving 0 queries per second as they are removed from topology. The queries per second and concurrent requests of the remaining two instances increases as the same overall cluster throughput is maintained with two instances.

Figure 11:
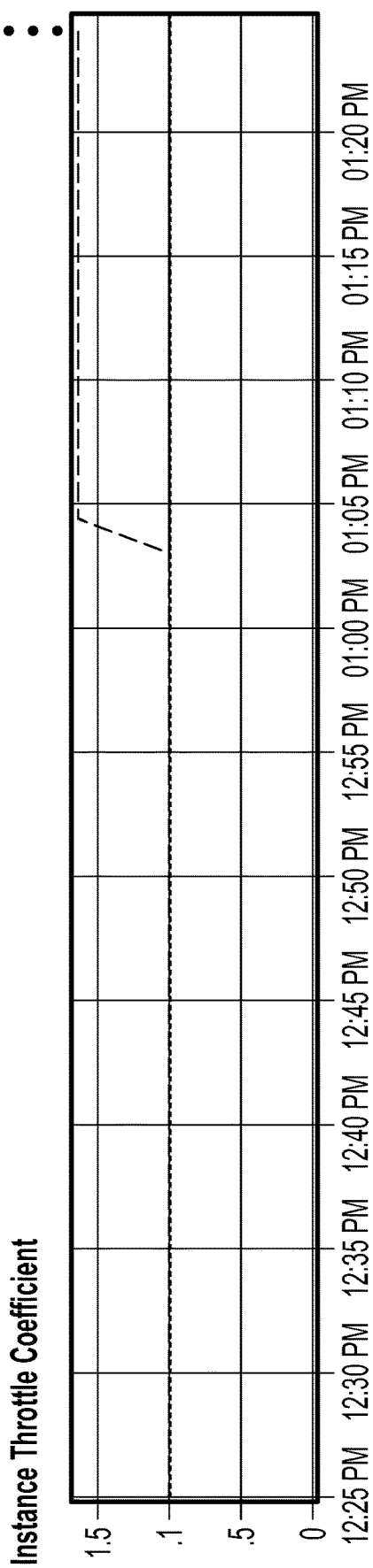
FIG. 11 shows throttle coefficients monitoring in an internal analysis cluster example, according to some example embodiments.
Figure 11:
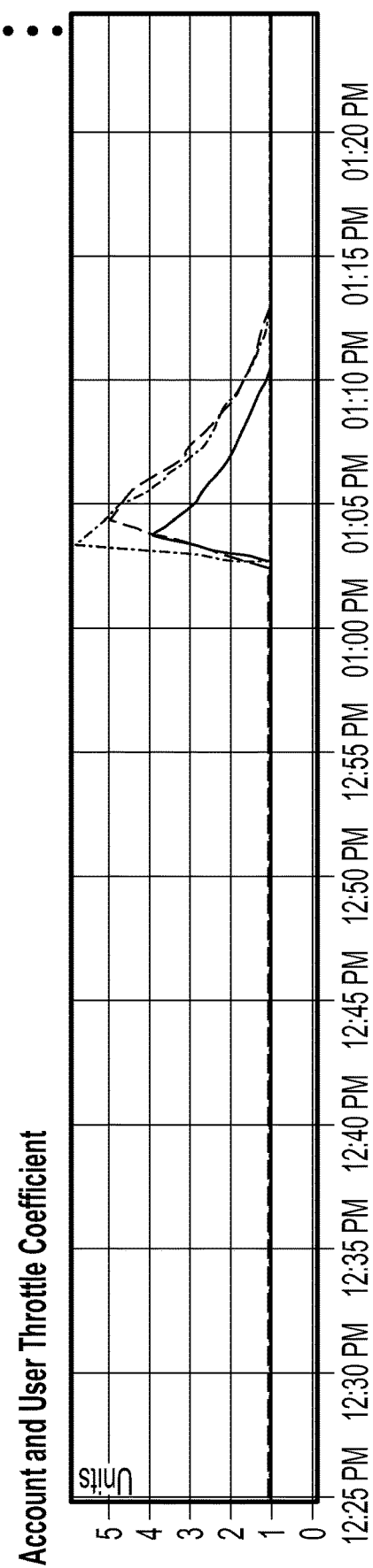

FIG. 11 shows throttle coefficients monitoring in an internal analysis cluster example. With dynamic throttling, the throttling coefficients were expanded automatically, providing additional gateway space for queries that could be handled safely. This removed any manual work to scale instances or gateway limits making the platform more resilient. Both the instance and account gateways were expanded which allowed the system to facilitate a higher throughput on each individual instance. Now the system, in this example, recognizes when clusters are overprovisioned and can reduce it to optimize resource usage.

Example 2—Query Concurrency Increased

Many clusters can run into previously static gateway limits. However, using the techniques described herein, these clusters can increase their total concurrency and their rejection rate was reduced.

Figure 12:
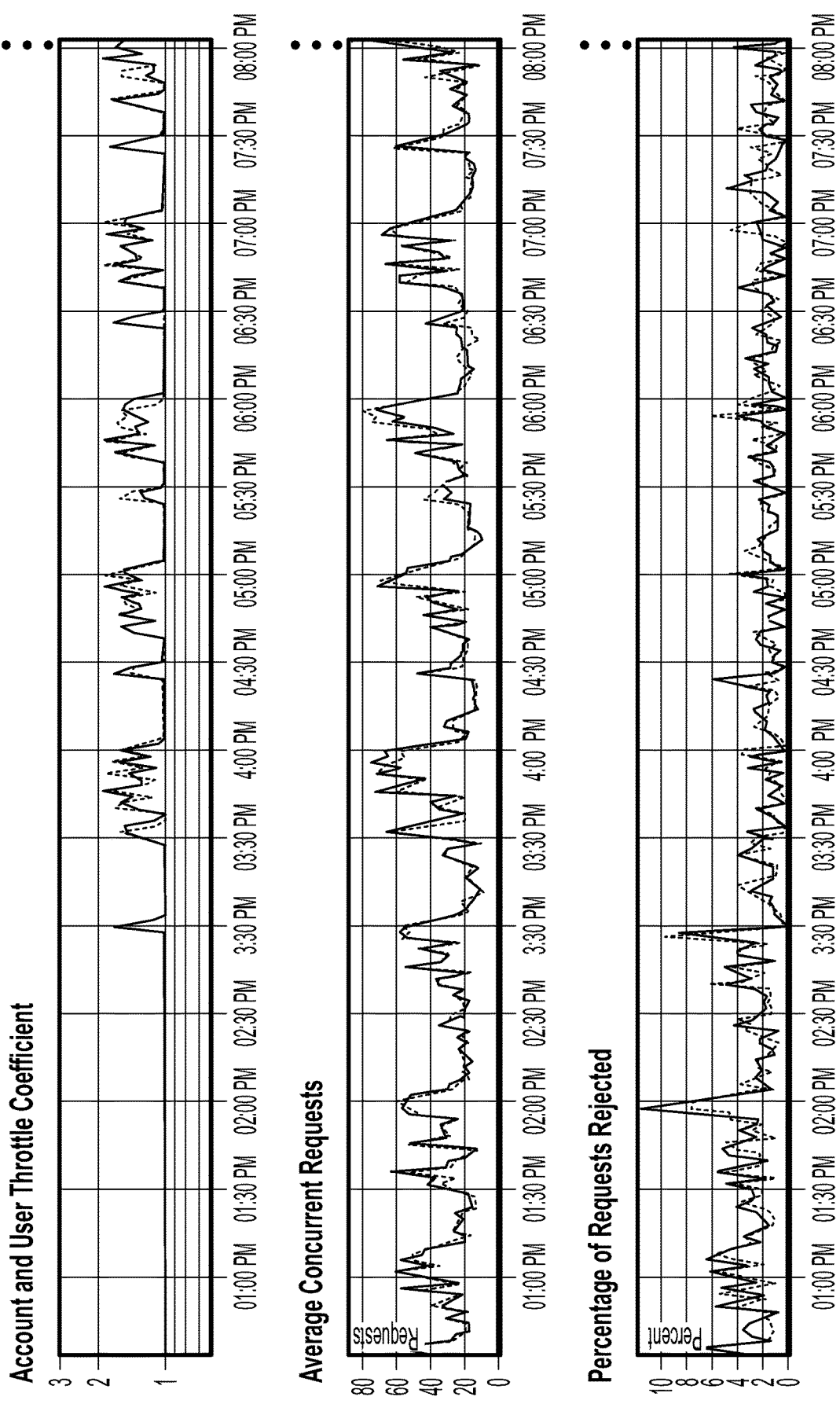
FIG. 12 shows a cluster workload monitoring in a query concurrency example, according to some example embodiments.

FIG. 12 shows a cluster workload monitoring in a query concurrency example. The top chart shows the account coefficient, which in this case will be greater than 1 when the respective gateways are expanded. By using the techniques described herein, around 3 pm, the rejection rate, in the bottom chart, was reduced and concurrent requests increased which can be seen in the center chart. It shall be appreciated that the increase to the coefficient was not high, which may have eliminated the rejections entirely.

Example 3—Noisy Neighbor

Figure 13:
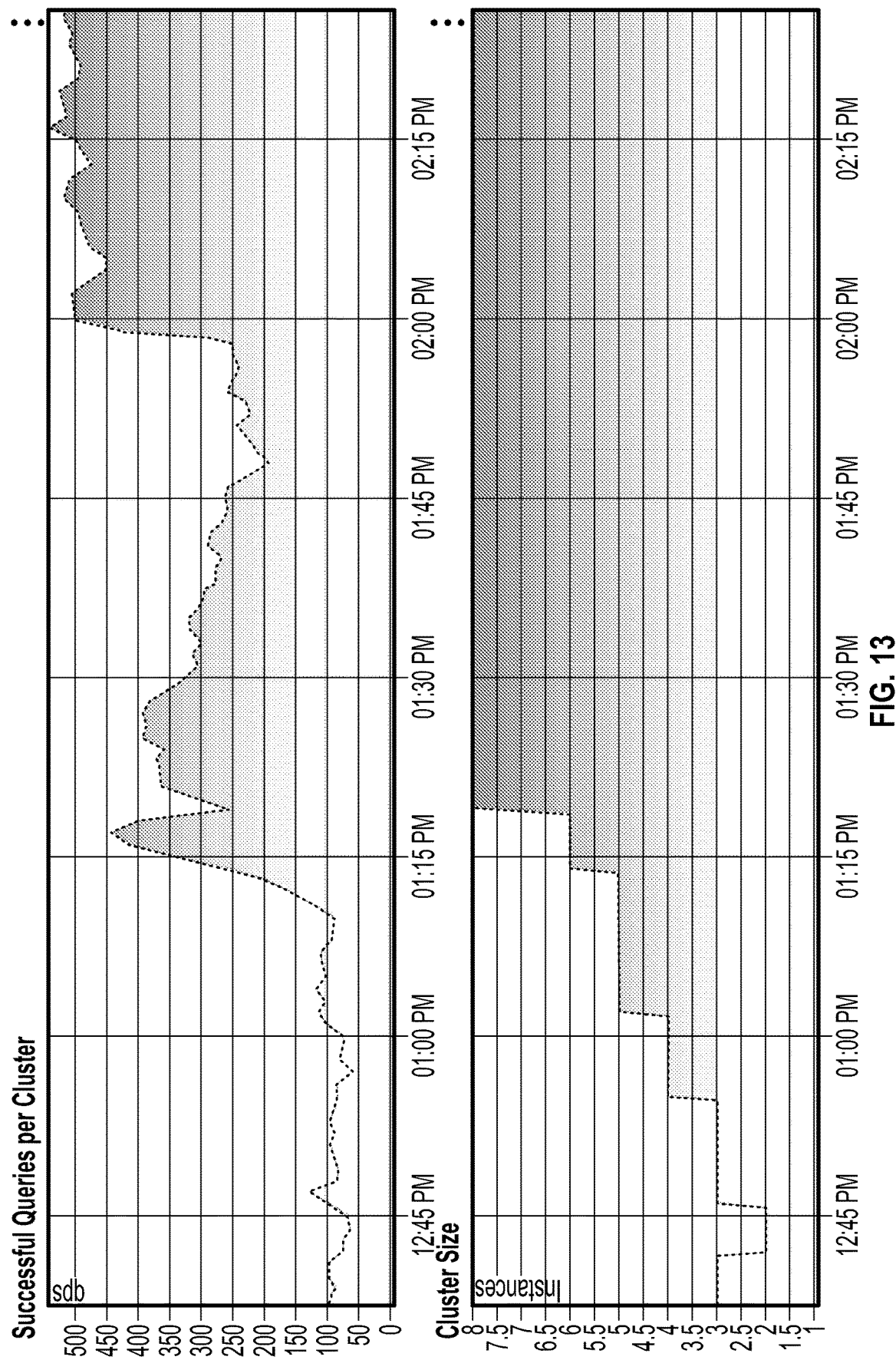
FIG. 13 is an example of a cluster that has been scaled up dramatically to handle the increased workload, according to some example embodiments.

Oftentimes "noisy neighbor" problems are encountered. A "noisy neighbor" occurs when a customer in a multi-tenant cluster begins a massive workload that starves other accounts in the cluster of resources. By using the autoscaling and dynamic throttling the database system is able to scale the cluster very quickly. FIG. 13 is an example of a cluster that has been scaled up dramatically to handle the increased workload. The cluster size chart represents the time the decision was made, not the actual virtual machine (VM) being moved into the cluster after the cache warmed and moved into topology.

In FIG. 13, it can be seen in the cluster size chart that previous to the noisy neighbor the traffic was low enough for the autoscaling system to decide to reduce the instance count to two. The throughput of the cluster was quadrupled from instances on hand in the free pool.

Example 4—Deployment Load

Figure 14:
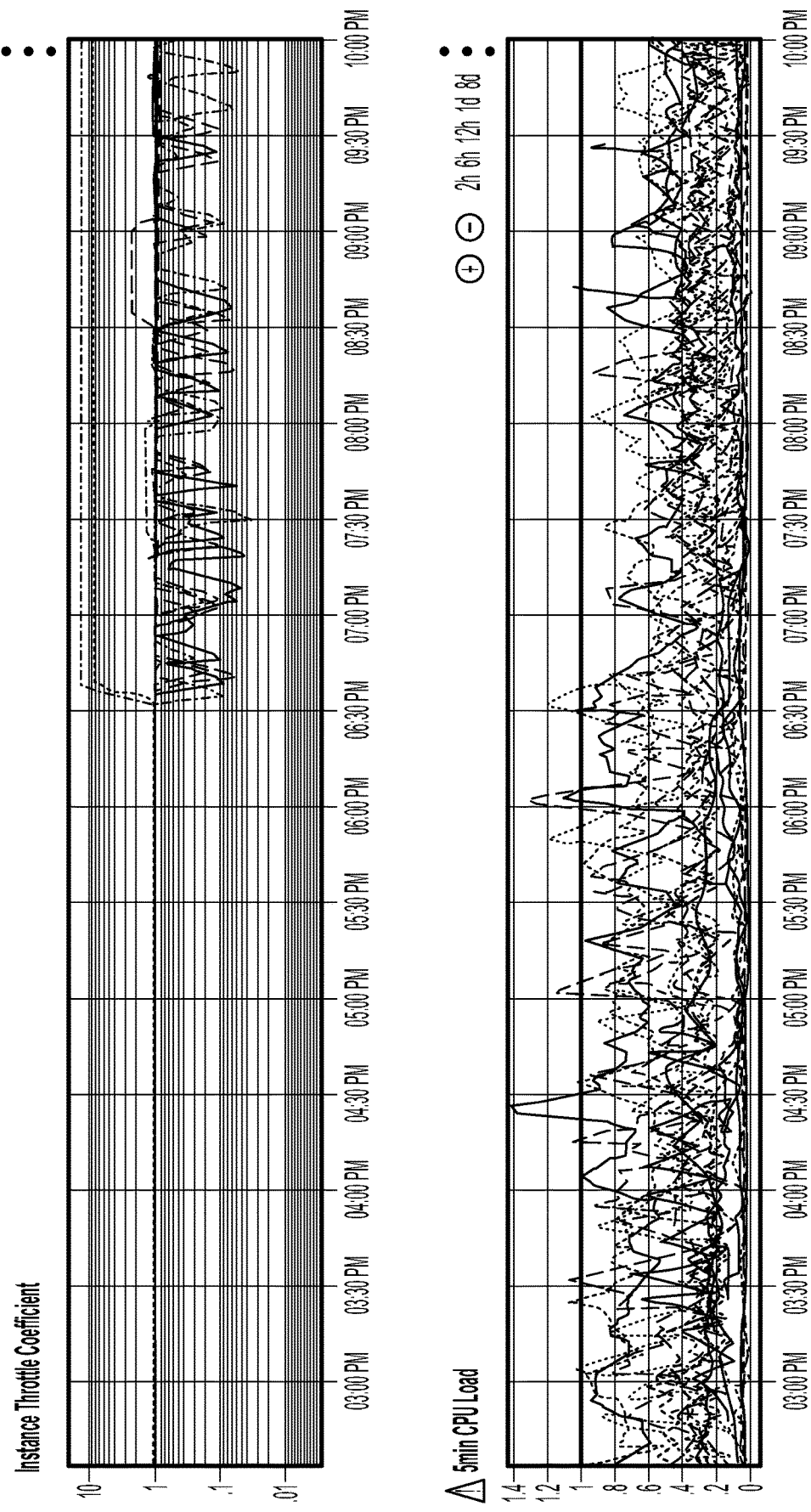
FIG. 14 shows CPU load monitoring in a deployment load example

An objective of the dynamic throttling is to reduce cases of high CPU load that instances encounter. FIG. 14 shows CPU load monitoring in a deployment load example. By using dynamic throttling, the 5-minute CPU load average charts lowered noticeably, in particular almost no nodes had a 5 minute CPU load higher than the target threshold of 1. In FIG. 14, the rollout occurs as the coefficient spreads, around 6:30 pm. The 5-minute CPU load average chart, showing the load average for every individual load in the deployment, no longer has cases where the load exceeds our target threshold. This effect was noticed across all of all deployments, with a few exceptions of particular instances managing to exceed this target. The end result of this has been a decrease in isolations based on high load average.

Figure 15:
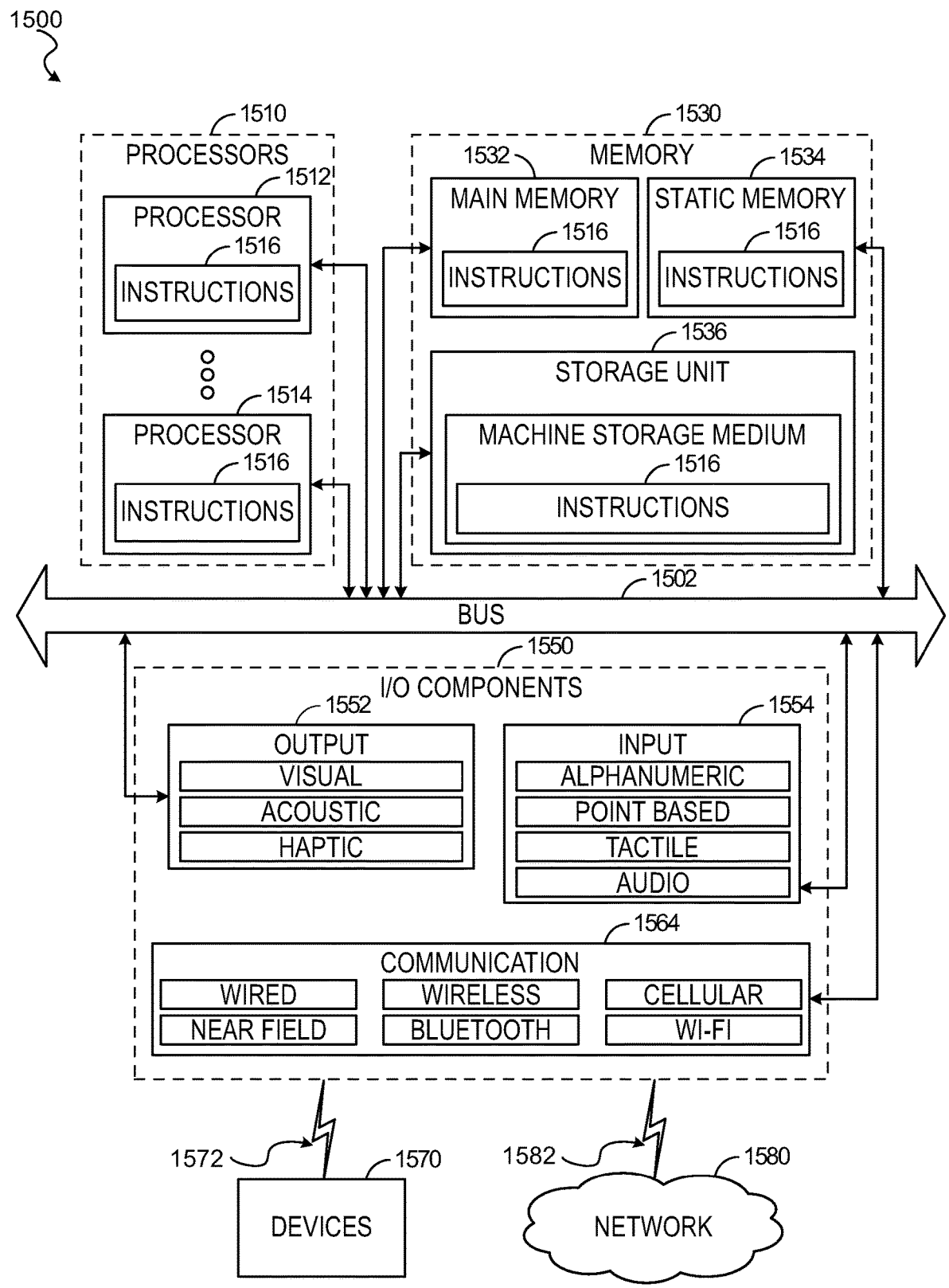
FIG. 15 illustrates a diagrammatic representation of a machine in the form of a computer system within which a set of instructions may be executed for causing the machine to perform any one or more of the methodologies discussed herein, in accordance with some embodiments of the present disclosure.

FIG. 15 illustrates a diagrammatic representation of a machine 1500 in the form of a computer system within which a set of instructions may be executed for causing the machine 1500 to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute any one or more operations of any one or more of the methods described herein. As another example, the instructions 1516 may cause the machine 1500 to implement portions of the data flows described herein. In this way, the instructions 1516 transform a general, non-programmed machine into a particular machine 1500 (e.g., the remote computing device 106, the access management system 158, the compute service manager 152, the execution platform 154, the access management system 158, the Web proxy 120, remote computing device 106) that is specially configured to carry out any one of the described and illustrated functions in the manner described herein.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 includes processors 1510, memory 1530, and input/output (I/O) components 1550 configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, and other communication components to provide communication via other modalities. The devices 1570 may be another machine or any of a wide variety of peripheral devices (e.g., a peripheral device coupled via a universal serial bus (USB)). For example, as noted above, the machine 1500 may correspond to any one of the remote computing device 106, the access management system 150, the compute service manager 152, the execution platform 154, the access management system 158, the Web proxy 120, and the devices 1570 may include any other of these systems and devices.

The various memories (e.g., 1530, 1532, 1534, and/or memory of the processor(s) 1510 and/or the storage unit 1536) may store one or more sets of instructions 1516 and data structures (e.g., software) embodying or utilized by any one or more of the methodologies or functions described herein. These instructions 1516, when executed by the processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., hypertext transfer protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: monitoring resource usage at a computing resource; determining that the resource usage has exceeded a maximum threshold; generating an estimate of an allotment of new inbound requests to be received by the computing resource to lower the resource usage below the maximum threshold; setting a gateway limit of new inbound requests based on the estimate to throttle new inbound requests received by the computing resource; for a defined time interval, periodically adjusting the gateway limit based on a current resource usage; and after the defined time interval, implementing a full recovery of the gateway limit.

Example 2. The method of example 2 wherein the estimate of the allotment is a first estimate and wherein the defined time interval is a first defined time interval, further comprising: after the defined time interval, generating a second estimate of the allotment of new inbound requests to be received by the computing resource to lower the resource usage below the maximum threshold; setting the gateway limit based on the second estimate to throttle new inbound requests received by the computing resource; for a second defined time interval, periodically adjusting the gateway limit based on the current resource usage; and after the second defined time interval, implementing the full recovery of the gateway limit.

Example 3. The method of any of examples 1-2, further comprising: rejecting new inbound requests over the gateway limit.

Example 4. The method of any of examples 1-3, further comprising: transmitting an instruction to a sender of a rejected inbound request to re-send the request after a set time.

Example 5. The method of any of examples 1-4, wherein the gateway limit is defined on a per-account basis.

Example 6. The method of any of examples 1-5, wherein the resource usage includes central processing unit load.

Example 7. The method of any of examples 1-6, wherein the resource usage includes memory capacity of the computing resource.

Example 8. The method of any of examples 1-7, determining that the resource usage is below a minimum threshold; determining that a rejection rate of new inbound requests is above rejection threshold; and expanding the allotment of new inbound requests to be received by the computing resource.

Example 9. A system comprising: one or more processors of a machine; and a memory storing instructions that, when executed by the one or more processors, cause the machine to perform operations implementing any one of example methods 1 to 8.

Example 10. A machine-readable storage device embodying instructions that, when executed by a machine, cause the machine to perform operations implementing any one of example methods 1 to 8.

What is claimed is:

1. A method comprising:
   generating an estimate of an allotment of new inbound requests to be received by a computing resource, the estimate defined to reduce resource usage of the computing resource below a maximum threshold;
   setting a gateway limit of new inbound requests based on the estimate to throttle new inbound requests received by the computing resource;
   monitoring resource usage at the computing resource in response to the throttling;
   determining that the resource usage is below a minimum threshold;
   determining that a rejection rate of new inbound requests is above a rejection threshold; and
   expanding the allotment of new inbound requests to be received by the computing resource based on determining that the resource usage is below a minimum threshold and that the rejection rate of new inbound requests is above the rejection threshold.

2. The method of claim 1, further comprising:
   for a defined time interval, periodically adjusting the gateway limit based on a current resource usage; and
   after the defined time interval, implementing a full recovery of the gateway limit.

3. The method of claim 2, wherein the estimate of the allotment is a first estimate and wherein the defined time interval is a first defined time interval, further comprising:
   after the defined time interval, generating a second estimate of the allotment of new inbound requests to be received by the computing resource to lower the resource usage below the maximum threshold;
   setting the gateway limit based on the second estimate to throttle new inbound requests received by the computing resource;
   for a second defined time interval, periodically adjusting the gateway limit based on the current resource usage; and
   after the second defined time interval, implementing the full recovery of the gateway limit.

4. The method of claim 1, further comprising:
rejecting new inbound requests over the gateway limit.
5. The method of claim 4, further comprising:
transmitting an instruction to a sender of a rejected inbound request to re-send the request after a set time.
6. The method of claim 1, wherein the gateway limit is defined on a per-account basis.
7. The method of claim 1, wherein the resource usage includes central processing unit load.
8. The method of claim 1, wherein the resource usage includes memory capacity of the computing resource.
9. A machine-storage medium embodying instructions that, when executed by a machine, cause the machine to perform operations comprising:
generating an estimate of an allotment of new inbound requests to be received by a computing resource, the estimate defined to reduce resource usage of the computing resource below a maximum threshold;
setting a gateway limit of new inbound requests based on the estimate to throttle new inbound requests received by the computing resource;
monitoring resource usage at the computing resource in response to the throttling;
determining that the resource usage is below a minimum threshold;
determining that a rejection rate of new inbound requests is above a rejection threshold; and
expanding the allotment of new inbound requests to be received by the computing resource based on determining that the resource usage is below a minimum threshold and that the rejection rate of new inbound requests is above the rejection threshold.
10. The machine-storage medium of claim 9, further comprising:
for a defined time interval, periodically adjusting the gateway limit based on a current resource usage; and
after the defined time interval, implementing a full recovery of the gateway limit.
11. The machine-storage medium of claim 10, wherein the estimate of the allotment is a first estimate and wherein the defined time interval is a first defined time interval, further comprising:
after the defined time interval, generating a second estimate of the allotment of new inbound requests to be received by the computing resource to lower the resource usage below the maximum threshold;
setting the gateway limit based on the second estimate to throttle new inbound requests received by the computing resource;
for a second defined time interval, periodically adjusting the gateway limit based on the current resource usage; and
after the second defined time interval, implementing the full recovery of the gateway limit.
12. The machine-storage medium of claim 9, further comprising:
rejecting new inbound requests over the gateway limit.
13. The machine-storage medium of claim 12, further comprising:
transmitting an instruction to a sender of a rejected inbound request to re-send the request after a set time.
14. The machine-storage medium of claim 9, wherein the gateway limit is defined on a per-account basis.
15. The machine-storage medium of claim 9, wherein the resource usage includes central processing unit load.
16. The machine-storage medium of claim 9, wherein the resource usage includes memory capacity of the computing resource.
17. A system comprising:
at least one hardware processor; and
at least one memory storing instructions that, when executed by the at least one hardware processor, cause the at least one hardware processor to perform operations comprising:
generating an estimate of an allotment of new inbound requests to be received by a computing resource, the estimate defined to reduce resource usage of the computing resource below a maximum threshold;
setting a gateway limit of new inbound requests based on the estimate to throttle new inbound requests received by the computing resource;
monitoring resource usage at the computing resource in response to the throttling;
determining that the resource usage is below a minimum threshold;
determining that a rejection rate of new inbound requests is above a rejection threshold; and
expanding the allotment of new inbound requests to be received by the computing resource based on determining that the resource usage is below a minimum threshold and that the rejection rate of new inbound requests is above the rejection threshold.
18. The system of claim 17, the operations further comprising:
for a defined time interval, periodically adjusting the gateway limit based on a current resource usage; and
after the defined time interval, implementing a full recovery of the gateway limit.
19. The system of claim 18, wherein the estimate of the allotment is a first estimate and wherein the defined time interval is a first defined time interval, the operations further comprising:
after the defined time interval, generating a second estimate of the allotment of new inbound requests to be received by the computing resource to lower the resource usage below the maximum threshold;
setting the gateway limit based on the second estimate to throttle new inbound requests received by the computing resource;
for a second defined time interval, periodically adjusting the gateway limit based on the current resource usage; and
after the second defined time interval, implementing the full recovery of the gateway limit.
20. The system of claim 17, the operations further comprising:
rejecting new inbound requests over the gateway limit.
21. The system of claim 20, the operations further comprising:
transmitting an instruction to a sender of a rejected inbound request to re-send the request after a set time.
22. The system of claim 17, wherein the gateway limit is defined on a per-account basis.
23. The system of claim 17, wherein the resource usage includes central processing unit load.
24. The system of claim 17, wherein the resource usage includes memory capacity of the computing resource.

* * * * *